G. W. N. Yost.
Harvester.

Nº 84927               Patented Dec. 15, 1868

Witnesses
James Densmore
William Wansleben

Inventor
Geo. W. N. Yost.
by Atty. J. C. Clayton

UNITED STATES PATENT OFFICE.

GEORGE W. N. YOST, OF CORRY, PENNSYLVANIA, ASSIGNOR TO THE CORRY MACHINE COMPANY.

IMPROVEMENT IN HARVESTERS.

Specification forming part of Letters Patent No. 84,927, dated December 15, 1868.

*To all whom it may concern:*

GEORGE W. N. YOST, of Corry, Erie county, Pennsylvania, have invented a new and useful Climax Yoke-Bolt, an improvement of my climax gearing, for grass and grain cutting machines.

The accompanying drawing, illustrating it, with the description herein, the specifying letters of drawing and description referring to one another, will enable others to make and use the invention.

Figure 1:
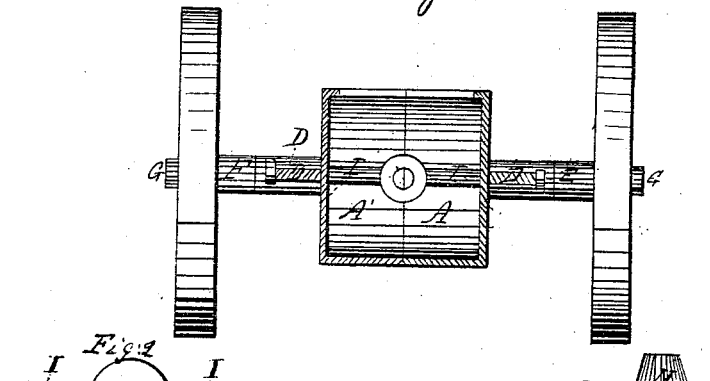
Figure 2:
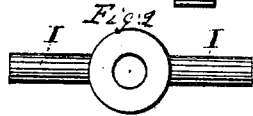
Figure 3:
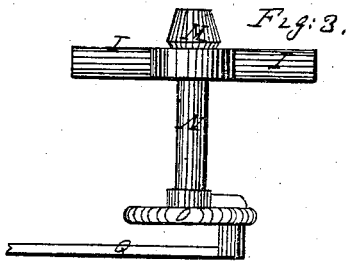

Figure 1 is a fore-end view of my climax-body inclosing my climax-gearing, with the end made transparent, to show the yoke-bolt therein. Fig. 7 is a side view of the yoke-bolt. Fig. 9 is a view of the bevel-pinion, pinion-shaft, crank-wheel, pitman, and yoke-bolt.

A and A' are the cases forming the body. D is a rib on each case. E is the main hub of each case. G and G' are the main axles. I is the forward bolt, fastening the cases together. M is the bevel-pinion. N is the pinion-shaft. O is the crank-wheel, and Q is the pitman.

Punch or split an aperture through the middle of the bolt I, and forge or make the aperture split or punched therein into a ring or hollow cylinder, with the middle of the cylinder on a plane with the longitudinal axis of the bolt. Put the pinion-shaft N therein, as in Fig. 9, and the invention is complete.

The bolt I is thus made into the gudgeon-box itself, and being thus made in and of itself both a fastening-bolt to hold together the cases A and A', and a gudgeon-box for the pinion-shaft N to run in, it tends to prevent all rattling and getting loose to which a separate gudgeon-box is liable, and is simpler, firmer, and cheaper than made in the other way.

What I claim, and desire to patent, is—

The bolt I, made and used as a gudgeon-box for the pinion-shaft N, and as a fastening-bolt for the cases A and A', as described, for grass and grain cutting machines.

G. W. N. YOST.

Witnesses:
O. W. ARCHBOLD,
FRANK H. W. GREGG.